(12) United States Patent
Mitou

(10) Patent No.: US 7,046,482 B2
(45) Date of Patent: May 16, 2006

(54) MAGNETIC HEAD

(75) Inventor: Koujiro Mitou, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 327 days.

(21) Appl. No.: 10/289,849

(22) Filed: Nov. 7, 2002

(65) Prior Publication Data

US 2003/0184914 A1    Oct. 2, 2003

(30) Foreign Application Priority Data

Mar. 28, 2002 (JP) .............................. 2002-091782

(51) Int. Cl.
*G11B 5/60* (2006.01)
(52) U.S. Cl. .................................................. 360/234.6
(58) Field of Classification Search ............ 360/234.6, 360/234.7, 294.7, 245, 245.5
See application file for complete search history.

(56) References Cited

U.S. PATENT DOCUMENTS

| | | | | |
|---|---|---|---|---|
| 4,797,763 A | * | 1/1989 | Levy et al. ............. | 360/245.6 |
| 5,235,484 A | * | 8/1993 | Maruyama ............... | 360/234.6 |
| 5,282,102 A | * | 1/1994 | Christianson ............ | 360/245.5 |
| 5,537,269 A | * | 7/1996 | Zarouri ................... | 360/97.01 |
| 5,557,488 A | * | 9/1996 | Hamilton et al. ........ | 360/245.9 |
| 5,687,042 A | * | 11/1997 | Chhabra et al. ......... | 360/234.6 |
| 6,307,719 B1 | * | 10/2001 | Mallary ................... | 360/294.7 |
| 6,735,051 B1 | * | 5/2004 | Zeng et al. .............. | 360/245.7 |
| 6,751,063 B1 | * | 6/2004 | Payne et al. ............. | 360/234.7 |
| 2001/0050828 A1 | * | 12/2001 | Davis et al. ............. | 360/97.01 |
| 2002/0024774 A1 | * | 2/2002 | Berger et al. ............ | 360/294.7 |

* cited by examiner

*Primary Examiner*—Angel Castro
(74) *Attorney, Agent, or Firm*—Greer, Burns & Crain, Ltd.

(57) ABSTRACT

The magnetic head of the present invention is a small magnetic head capable of reducing inertia working thereto. The magnetic head of the present invention includes a suspension having a front end section and a rear end section, a slider mounting section formed in the front end section of the suspension, and a slider mounted on the slider mounting section. The slider has a front end face and a rear end face, in which a read/write element is formed. The rear end face of the slider includes the read/write element, and is headed to the rear end section of the suspension.

4 Claims, 3 Drawing Sheets

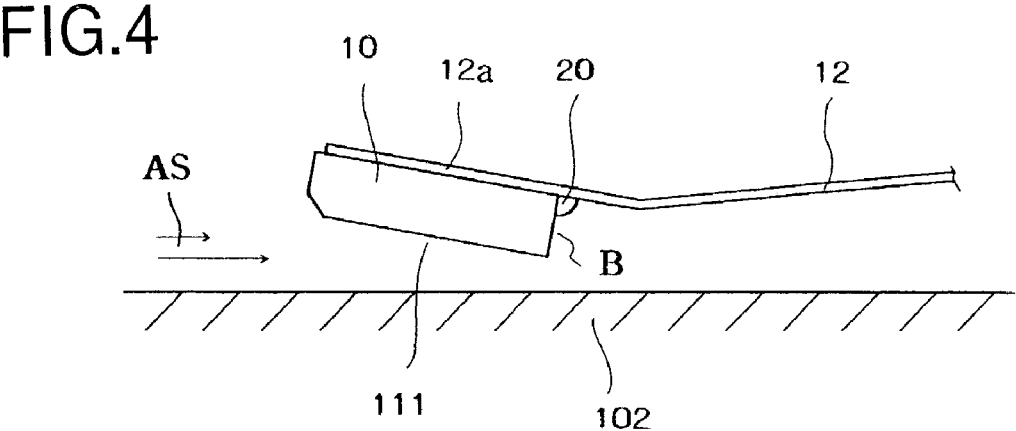
FIG.4
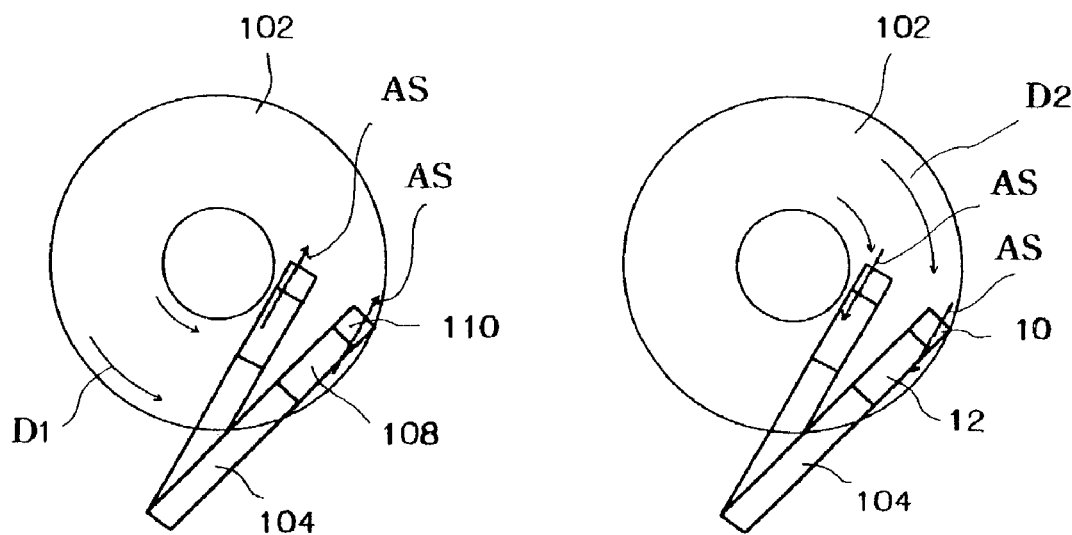
FIG.5A
PRIOR ART
FIG.5B

MAGNETIC HEAD

BACKGROUND OF THE INVENTION

The present invention relates to a magnetic head of a magnetic disk drive unit.

A typical conventional magnetic disk drive unit is shown in FIG. 6. A symbol 100 stands for an enclosure of the disk drive unit. A magnetic disk 102 is accommodated in the enclosure 100 as a data recording medium. An arm 104 is swung by an actuator 106. A suspension 108 is fixed to a front end of the arm 104. A slider 110 is attached to a front end of the suspension 108 to face the magnetic disk 102. To read or write data, the magnetic disk 102 is rotated and the arm 104 is swung about a shaft 105.

FIG. 7 is an enlarged view of the suspension 108 to which the slider 100 is attached. The suspension 108 is an elastic thin metal plate, and the a gimbal section, to which the slider 100 is fixed, is provided to the front end of the suspension 108. A slit encloses the gimbal section 120, and the gimbal section 120 is connected to the front end of the suspension 10;8 by a connecting section 122.

The slider 110 is fixed to the gimbal section 120, and its front end face "A" (see FIG. 8), in which a read/write element has been formed, is headed to the front end of the suspension 108. Cable patterns are formed on the suspension 108 and take a long way to terminals of the slider 110 via the connecting section 122. Note that, a symbol 112 stands for float patterns formed on a disk-side face of the slider 110.

In FIG. 8, the magnetic head is floated by an air stream "AS" caused by the rotation of the magnetic disk 102. The air stream "AS" works to the disk-side face 111 from the rear side of the slider 110. The slider 110 is slightly floated from a surface of the magnetic disk 102 by function of the float patterns 112. With this action, the slider 110 is inclined and floated as shown in FIG. 8, so a lower edge of the front end face "A" including the read/write element is the lowest position close to the surface of the magnetic disk 102.

As described above, the magnetic head is floated from the surface of the magnetic disk 102 by the air stream "AS" caused by the rotation of the magnetic disk 102. And, the arm 104 is swung in the state, in which the slider 110 is floated, so as to read or write data. The magnetic head is actuated at very high speed, so inertia working to the magnetic head should be low. However, as shown in FIGS. 6–8, the end face "A" of the slider 110 including the read/write element is headed to the front end of the suspension 108, so the front end section of the suspension 108 must be extended to form the cable patterns. By extending the front end section of the suspension 108, the inertia working to the magnetic head must be greater.

These days, small size magnetic disk drive units are required, so sizes of magnetic heads are made smaller. Therefore, the conventional magnetic head, in which the front end section of the suspension 108 is forwardly projected from the slider 110, cannot be used for the small size magnetic disk drive unit.

SUMMARY OF THE INVENTION

The present invention has been invented so as to solve the problems of the conventional magnetic head.

An object of the present invention is to provide a small magnetic head, which can be properly employed to a magnetic disk drive unit and which is capable of reducing inertia working thereto.

To achieve the object, the magnetic head of the present invention comprises:

a suspension having a front end section and a rear end section;

a slider mounting section being formed in the front end section of the suspension; and a slider being mounted on the slider mounting section, the slider having a front end face and a rear end face, in which a read/write element is formed, wherein the rear end face of the slider including the read/write element is headed to the rear end section of the suspension.

In the magnetic head, a planar shape of the slider mounting section may be formed into a rectangular shape corresponding to a planar shape of the slider.

In the magnetic head, a front end of the slider may be forwardly projected from a front end of the slider mounting section.

In the magnetic head, the slider mounting section may be connected to the suspension by an adjusting section, which adjusts elasticity applied to the slider, and the slider mounting section, the adjusting section and the suspension may be integrated in one pieced.

In the magnetic head of the present invention, the size of the magnetic head can be smaller than that of the conventional magnetic head, so that a smaller magnetic disk drive unit can be produced. Further, the inertia working to the magnetic head can be made lower, so that the magnetic disk head can be actuated at higher speed.

BRIEF DESCRIPTION OF THE DRAWINGS

Embodiments of the present invention will now be described by way of examples and with reference to the accompanying drawings, in which:

FIG. 4 is an explanation view of the magnetic head floating from a surface of a magnetic disk;

FIG. 5A is an explanation view showing a rotational direction of the magnetic disk of the conventional magnetic disk drive unit;

FIG. 5B is an explanation view showing a rotational direction of the magnetic disk;

DETAILED DESCRIPTION OF THE EMBODIMENTS

Preferred embodiments of the present invention will now be described in detail with reference to the accompanying drawings.

Figure 1:
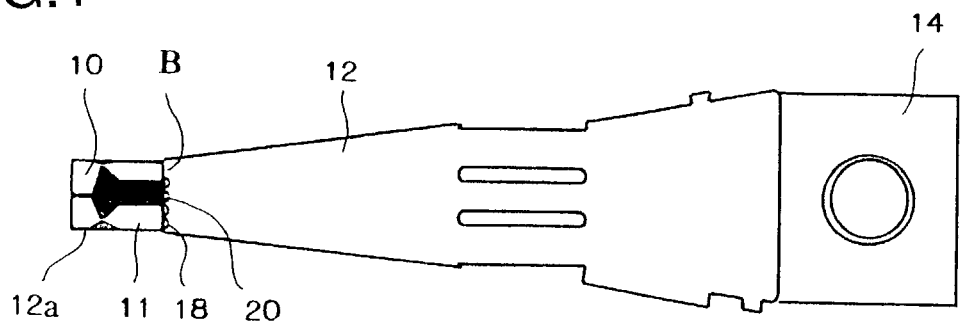
FIG. 1 is a plan view of a magnetic head of an embodiment of the present invention.

FIG. 1 is a plan view of a magnetic head of an embodiment of the present invention.

Figure 7:
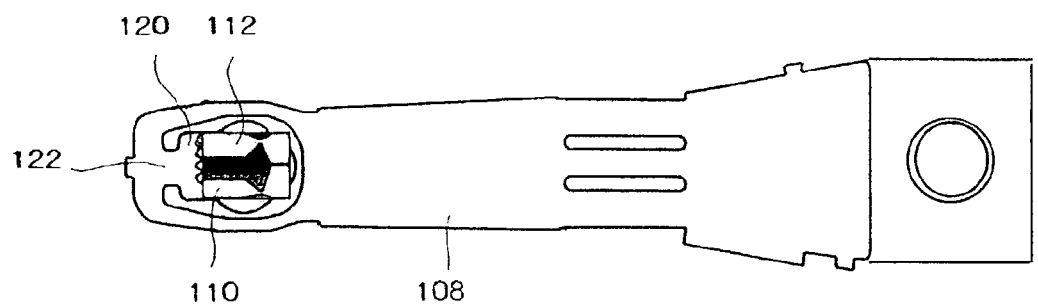
FIG. 7 is the plan view of the conventional magnetic head.
Figure 8:
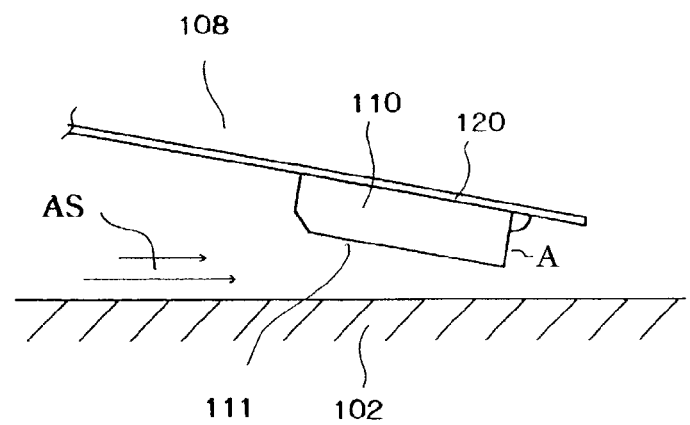
FIG. 8 is the explanation view of the conventional magnetic head floating from the surface of the magnetic disk.

In the present embodiment, the slider 10 attached to a suspension 12 is inversely headed with respect to the heading of the slider of the conventional magnetic head (see FIGS. 7 and 8). Namely, in the conventional magnetic head, the end face "A" of the slider 110 including the read/write element is headed to the front end of the suspension 108 (see FIGS. 7 and 8). On the other hand, in the present embodiment, the slider 10 is mounted on the suspension 12, and a rear end face "B" of the slider 10 including the read/write element is headed to a rear end section of the suspension 12. Note that, a symbol 14 stands for a spacer fixed to the rear end section of the suspension 12.

In the conventional magnetic head shown in FIG. 7, the cable patterns must take a long way via the front end of the suspension 108. On the other hand, in the magnetic head shown in FIG. 1, cable patterns can be directly extended from terminals of the slider 10 toward the rear end section of the suspension 12. With this structure, the cable patterns can be easily formed on the suspension 12.

Figure 2:
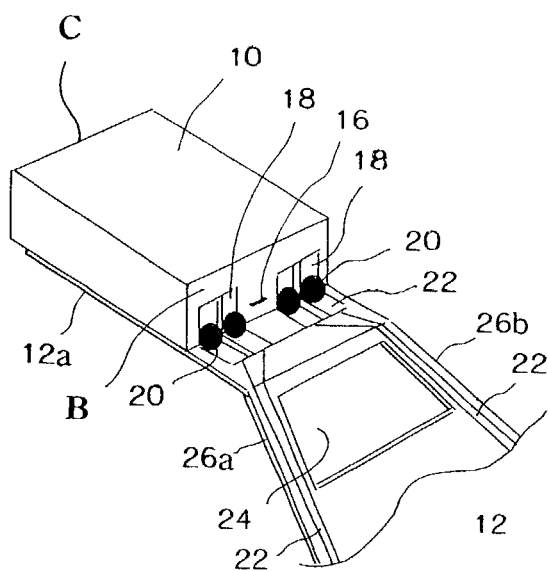
FIG. 2 is a perspective view of a suspension, to which a slider is attached.

FIG. 2 is an enlarged view of the slider 10 attached to the suspension 12. The read/write element 16 is formed in the rear end face "B" of the slider 10. The cable patterns 22 are respectively connected to the terminals 18 of the slider 10 by gold balls 20.

In the magnetic head of the present embodiment, a slider mounting section 12a is formed in the front end section of the suspension 12, and a planar shape of the slider mounting section 12a is formed into a rectangular shape corresponding to a planar shape of the slider 10. Namely, the width of the slider mounting section 12a is almost equal to that of the slider 10. When the slider 10 is mounted onto and connected to the slider mounting section 12a, the slider 10 is positioned so as not to project a front end of the slider mounting section 12a from the front end face "C" of the slider 10. Namely, the front end of the slider 10 is forwardly projected from the front end of the slider mounting section 12a.

The suspension 12 has proper elasticity. The elasticity balances with a lifting force, which floats the slider 10 and which is generated by the air stream "AS" caused by rotation of a magnetic disk. In the present embodiment, a trapezoid through-hole is formed in a rear end section of the slider mounting section 12a, and the slider mounting section 12a is connected to a main section of the suspension 12 by a pair of thin arm sections 26a and 26b. The elasticity of the suspension 12, which works to the slider 10, can be adjusted by adjusting width and length of the arm sections 26a and 26b. Therefore, in the present embodiment, the arm sections 26a and 26b act as an adjusting section, which adjusts the elasticity applied to the slider 10.

Figure 3:
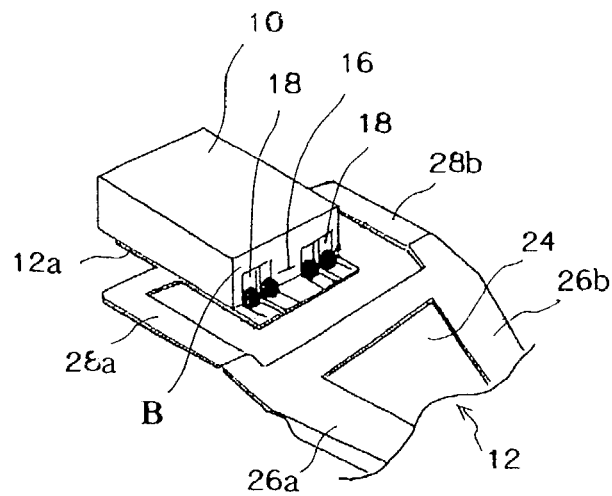
FIG. 3 is a perspective view of the magnetic head of another embodiment.
Figure 6:
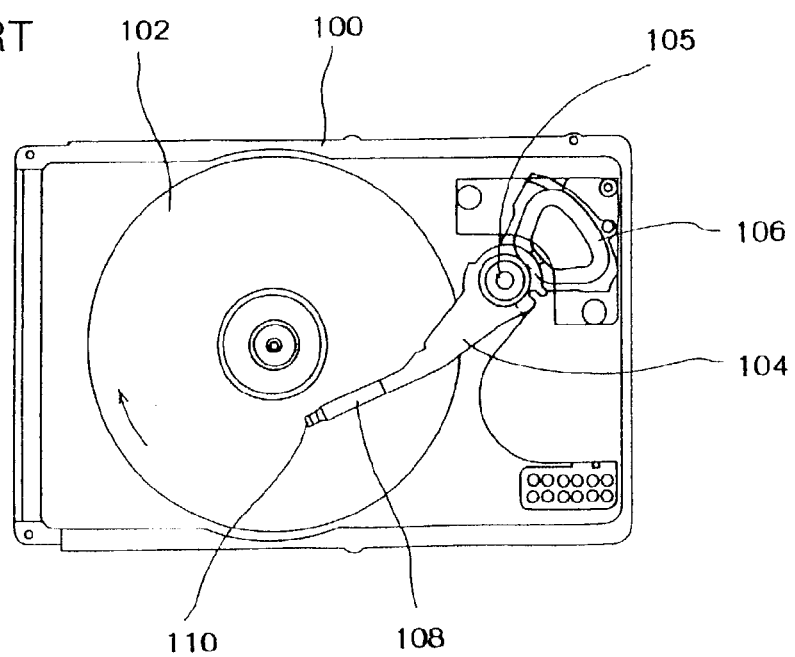
FIG. 6 is the schematic view of the conventional disk drive unit.

The magnetic head of another embodiment of the present invention is shown in FIG. 3. The structural elements explained in the foregoing embodiment are assigned the same symbols and explanation will be omitted. L-shaped arms 28a and 28b are respectively extended from front ends of the arm sections 26a and 26b, which are provided in the front end section of the suspension 12. The slider mounting section 12a is held by the L-shaped arms 28a and 28b. The L-shaped arms 28a and 28b act as the gimbal section 120 of the suspension 108 (see FIGS. 7 and 8) of the conventional magnetic head. A shape of the adjusting section, which adjusts the elasticity applied to the slider 10, may be designed on the basis of the elasticity. In the embodiment shown in FIG. 3, the cable patterns on the suspension 12 are connected to the terminals 18 of the slider 10 via the arm sections 26a and 26b and the L-shaped arms 28a and 28b.

FIG. 4 shows the magnetic head of the present invention, which is assembled in a magnetic disk drive unit. The magnetic head is floating from a surface of the magnetic disk 102 rotating. The magnetic head is floated by the air stream "AS" caused by the rotation of the magnetic disk 102 as well as the conventional magnetic head (see FIG. 8). But the air stream "AS" works to the disk-side face 111 of the slider 10 from the front side of the slider 10. The air stream "AS" comes from the opposite side of the rear end face "B" including the read/write element 16. With this structure, the slider 10 can be floated from the surface of the magnetic disk 102 while recording or writing data as well as the conventional magnetic head.

Note that, as shown in FIGS. 1 and 7, the float patterns 11 of the embodiment and the float patterns 112 of the conventional magnetic may be same.

FIG. 5A is an explanation view showing a rotational direction of the magnetic disk 102 of the conventional magnetic disk drive unit and a direction of the air stream "AS"; FIG. 5B is an explanation view showing a rotational direction of the magnetic disk 102 and a direction of the air stream "AS" of the embodiments.

In the conventional disk drive unit shown in FIG. 5A, the arm 104 is swung between an inner edge of the magnetic disk 102 and an outer edge thereof. By rotating the magnetic disk 102 in the direction "D1", the air stream "AS" flows from the rear end section of the suspension 108 to the front end section thereof.

On the other hand, in the disk drive unit including the magnetic head of the present embodiment, the magnetic disk 102 is rotated in the direction "D2", so that the air stream "AS" flows from the front end section of the suspension 12 to the rear end section thereof as shown in FIG. 5B. Namely, the magnetic disk 102 of the present embodiment is rotated in the opposite direction so as to flow the air stream "AS" in the opposite direction with respect to the suspension. Since the end face "B" of the slider 10, which includes the read/write element 16, is headed to the rear end section of the suspension 12, the magnetic disk 102 is rotated in the direction "D2", which is the opposite direction with respect to the rotational direction "D1" of the conventional disk drive unit. Note that, the structure of the disk drive unit of the present embodiment may be equal to that of the conventional disk drive unit but the magnetic head and the rotational direction of the magnetic disk.

In the case of providing a loading/unloading mechanism to the front end section of the suspension of the magnetic head, the loading/unloading mechanism may be extended from the end of the slider mounting section 12a of the suspension 12. Therefore, the loading/unloading mechanism can be formed easily.

As shown in FIG. 1, only the slider mounting section 12a, on which the slider 10 is mounted, is provided to the front end section of the suspension 12, and the front end of the suspension 12 is not forwardly projected or extended from the front end of the slider 10. With this structure, the inertia working to the magnetic head can be effectively reduced.

Further, in comparison with the conventional magnetic head, the inertia working to the magnetic head, which includes the loading/unloading mechanism, can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by he foregoing description and all changes which come within the meaning and range of equivalency of the claims are therefore intended to be embraced therein.

What is claimed is:

1. A magnetic head, comprising:

a suspension having a front end section and a rear end section;

a slider mounting section being formed in the front end section of said suspension; and a slider being mounted on said slider mounting section, said slider having an end face, in which a read/write element is formed, wherein the end face of said slider including the read/write element is headed to the rear end section of said suspension, and a connecting section, which connects terminals of the read/write element to cable patterns connected to said slider, is formed in a part of the end face of said slider including the read/write element, wherein a front end of said slider is forwardly projected from a front end of said slider mounting section, such that no portion of said suspension extends more forward then the front end of said slider.

2. The magnetic head according to claim 1, wherein a planar shape of said slider mounting section is formed into a rectangular shape corresponding to a planar shape of said slider.

3. The magnetic head according to claim 1, wherein said slider mounting section is connected to said suspension by an adjusting section, which adjusts elasticity applied to said slider, and said slider mounting section, said adjusting section and said suspension are integrated in one piece.

4. A magnetic head, comprising:

a suspension having a front end section and a rear end section;

a slider mounting section being formed in the front end section of said suspension; and a slider being mounted on said slider mounting section, said slider having an end face, in which a read/write element is formed, wherein the end face of said slider including the read/write element is headed to the rear end section of said suspension, and wherein said slider mounting section is connected to said suspension by an adjusting section, which includes two generally L-shaped arms, with each of the generally L-shaped arms including an end portion that connects with a side surface of said slider mounting section.

* * * * *